(12) United States Patent
Okamoto et al.

(10) Patent No.: US 8,071,221 B2
(45) Date of Patent: Dec. 6, 2011

(54) ORGANIC RESIN COMPOSITION, SOLUTION OF THE SAME AND SHAPED ARTICLE OF THE SAME

(75) Inventors: Satoshi Okamoto, Tsukuba (JP); Min-soo Yang, Anyang (KR); Dong-pil Park, Siheung (KR)

(73) Assignees: Sumitomo Chemical Company, Limited, Tokyo (JP); Dongwoo Fine-Chem Co., Ltd., Jeonbuk (KR)

( * ) Notice: Subject to any disclaimer, the term of this patent is extended or adjusted under 35 U.S.C. 154(b) by 750 days.

(21) Appl. No.: 11/094,356

(22) Filed: Mar. 31, 2005

(65) Prior Publication Data

US 2005/0227102 A1  Oct. 13, 2005

(30) Foreign Application Priority Data

Apr. 2, 2004  (KR) .................. 10-2004-0023030

(51) Int. Cl.
  *B32B 27/00*  (2006.01)
(52) U.S. Cl. .......... 428/480; 428/1.1; 428/1.6; 428/500; 524/442
(58) Field of Classification Search .................. None
  See application file for complete search history.

(56) References Cited

U.S. PATENT DOCUMENTS

| | | | | |
|---|---|---|---|---|
| 2,102,074 A | * | 12/1937 | Ipatieff et al. ............. 585/517 |
| 2,386,468 A | * | 10/1945 | Ipatieff et al. ............. 585/666 |
| 2,649,388 A | * | 8/1953 | Haines et al. ............. 427/215 |
| 3,352,734 A | * | 11/1967 | McIntyre et al. .......... 156/180 |
| 3,649,556 A | * | 3/1972 | Hoffman ..................... 516/83 |
| 4,321,184 A | * | 3/1982 | Blount ........................ 524/3 |
| 4,346,185 A | * | 8/1982 | Blount ........................ 524/5 |
| 4,378,441 A | * | 3/1983 | Blount ...................... 521/154 |
| 4,451,638 A | * | 5/1984 | Blount ...................... 528/205 |
| 5,268,414 A | * | 12/1993 | Nakai et al. ............... 524/539 |
| 5,352,746 A | * | 10/1994 | Asai et al. ................. 525/444 |
| 5,612,101 A | * | 3/1997 | Furuta et al. .............. 428/357 |
| 5,820,780 A | * | 10/1998 | Furuta et al. ............ 252/299.01 |
| 5,830,940 A | * | 11/1998 | Nakamura et al. ......... 524/404 |
| 5,969,083 A | * | 10/1999 | Long et al. ................. 528/194 |
| 5,989,758 A | * | 11/1999 | Komatsu et al. ............. 430/20 |
| 6,355,214 B1 | * | 3/2002 | Fader et al. .................. 422/13 |
| 6,664,341 B2 | * | 12/2003 | Kitayama et al. ............ 525/437 |
| 6,758,989 B2 | * | 7/2004 | Miyashita et al. ....... 252/299.01 |
| 6,838,546 B2 | * | 1/2005 | Okamoto et al. ............ 528/495 |
| 6,894,141 B2 | * | 5/2005 | Satoh et al. ................. 528/196 |
| 7,160,499 B2 | * | 1/2007 | Miyata et al. .............. 264/564 |
| 2002/0049270 A1 | * | 4/2002 | Okamoto et al. ............ 524/341 |
| 2002/0071783 A1 | * | 6/2002 | Fader et al. .................. 422/13 |
| 2003/0078333 A1 | | 4/2003 | Kawaguchi et al. |
| 2004/0058137 A1 | * | 3/2004 | Okamoto et al. ............ 428/209 |
| 2004/0067361 A1 | * | 4/2004 | Chao ........................... 428/405 |
| 2005/0131121 A1 | * | 6/2005 | Tsutsumi et al. ............ 524/413 |

FOREIGN PATENT DOCUMENTS

| | | |
|---|---|---|
| JP | 08-217894 A | 8/1996 |
| JP | 09-124836 A | 5/1997 |
| JP | 11-171532 | 6/1999 |
| JP | 2002-012778 | 1/2002 |
| JP | 2003-105178 A | 4/2003 |
| WO | 01/40380 A1 | 6/2001 |
| WO | WO 01/53416 A1 * | 7/2001 |
| WO | 03/010220 A1 | 2/2003 |

OTHER PUBLICATIONS

Specifications for VECTRA: Liquid Crystal polymer (LCP); TICONA GmbH; pp. 1-76; published Sep. 2001.*
Japanese Office Action dated Apr. 13, 2010, issued in corresponding Japanese Application No. 2004-133187.

* cited by examiner

*Primary Examiner* — John J Figueroa
(74) *Attorney, Agent, or Firm* — Sughrue Mion, PLLC

(57) ABSTRACT

An organic resin composition with a low coefficient of thermal expansion comprising (a) an organic resin and (b) an inorganic silicate containing alkali metals and alkaline earth metals in a total amount of 1,000 ppm or less.

13 Claims, No Drawings

ORGANIC RESIN COMPOSITION, SOLUTION OF THE SAME AND SHAPED ARTICLE OF THE SAME

This application claims priority to Korean Patent Application No. 2004-23030, which is herein incorporated by reference in its entirety.

BACKGROUND OF THE INVENTION

1. Field of the Invention

The present invention relates to an organic resin composition comprising an organic resin and an inorganic silicate, which is useful in the field of electric and electronic devices, a solution comprising the same and a shaped article thereof.

2. Description of the Background Art

A resin composition containing an inorganic silicate such as montmorillonite is well known in the state of art. For example, JP-A-2003-105178 discloses a resin composition comprising a resin and an inorganic silicate, which is used as a raw material of a gas-barrier film to be used in various wrapping applications.

However, when such a resin composition as disclosed in JP-A-2003-105178 is used as a material of an electronic device, the device may not always have satisfactory properties in practical use, since a film or a sheet formed from such a composition has a high coefficient of thermal expansion and thus a laminate of such a film or a sheet and a metal sheet may suffer from deformation such as warp.

SUMMARY OF THE INVENTION

An object of the present invention is to provide an organic resin composition comprising an organic resin and an inorganic silicate and having lower thermal expansibility.

Another object of the present invention is to provide a shaped article of an organic resin composition comprising an organic resin and an inorganic silicate and having lower thermal expansibility.

Accordingly, the present invention provides an organic resin composition comprising (a) an organic resin and (b) an inorganic silicate containing alkali metals and alkaline earth metals in a total amount of 1,000 ppm or less.

The present invention also provides a solution comprising the organic resin composition of the present invention and a solvent.

Furthermore, the present invention provides a shaped article such as a film comprising the resin composition of the present invention.

The resin composition of the present invention and the shaped article comprising such a resin composition have low thermal expansibility, that is, a low coefficient of thermal expansion.

DETAILED DESCRIPTION OF THE PREFERRED EMBODIMENTS

The kind of the organic resin (a) used in the present invention is not limited and may be any conventional organic polymer. Specific examples of the organic resin include thermoplastic resins such as polyolefin (e.g. polyethylene, polypropylene, etc.), styrene base resins (e.g. polystyrene, styrene copolymers, etc.), polyvinyl chloride, polyamide, polyacrylonitrile, thermoplastic polyimide, polyethylene terephthalate, polybutylene terephthalate, liquid crystalline polyester, polyphenylene sulfide, polyether ketone, polycarbonate, polyether sulfone, polyphenyl ether and its derivatives and polyetherimide; thermosetting resins such as phenol resins, epoxy resin, thermosetting polyimide and cyanate resins; and the like.

Among them, thermosetting polyimide, epoxy resins, cyanate resins, liquid crystalline polyester, polyphenylene sulfide, polyether sulfone and polyether ketone are preferably used as electronic materials.

In particular, liquid crystalline polyester is most preferable as the resin (a) from the viewpoint of the high heat resistance and response to high frequency which are necessary to recent electronic materials. As liquid crystalline polyester, a polyester, which is soluble in a solvent containing at least 30% by weight of a halogen-substituted phenol compound represented by the formula (I) below, is preferable, since it has a small anisotropy and can be filled with a larger amount of the inorganic silicate (b).

wherein A is a halogen atom or a halogenated alkyl group such as a trifluoromethyl group, and i is the number of A and is an integer of 1 to 5, provided that when i is an integer of 2 to 5, the substituents A may be the same or different.

A solvent in which the liquid crystalline polyester is dissolved preferably contains at least 50% by weight, more preferably at least 60% by weight of the halogen-substituted phenol compound (I). Most preferably, the solvent is the pure (100% by weight) halogen-substituted phenol compound (I).

Preferably, i in the formula (I) is 1, 2 or 3, more preferably 1 or 2. When i is 1, A is preferably present at the 4-position, and when i is at least 2, at least one of the substituents A is preferably present at the 4-position, with the substitution position of a hydroxyl group being 1-position.

The halogen atom for A in the formula (I) is a fluorine atom, a chlorine atom, a bromine atom or an iodine atom. Among them, a fluorine atom and a chlorine atom are preferable from the viewpoint of the solubility of the resin in the compound (I), and a chlorine atom is more preferable since the compound (I) in which A is a chlorine atom has good balance of its cost and the solubility of the resin.

Specific examples of the compound of the formula (I) in which A is a chlorine atom include 4-chlorophenol, 2,4-dichloro-phenol, 3,4-dichlorophenol, 2,4,5-trichlorophenol, 2,4,6-trichlorophenol, pentachlorophenol, etc. Specific examples of the compound of the formula (I) in which one of As is a fluorine atom include 4-chloro-2-fluorophenol, 4-chloro-3-fluoro-phenol, etc. Specific examples of the compound of the formula (I) in which one of As is a bromine atom include 4-chloro-2-bromophenol, etc. Specific examples of the compound of the formula (I) in which one of As is an iodine atom include 4-chloro-2-iodophenol, etc.

Specific examples of the compound of the formula (I) in which one of As is a halogenated alkyl group include 4-chloro-2-trifluoromethylphenol, 4-chloro-2-pentafluoroethylphenol, etc.

More preferably, A in the formula (I) is a chlorine atom. Therefore, preferable examples of the compound of the formula (I) include 4-chlorophenol, 2,4-dichlorophenol, 3,4- dichlorophenol, 2,4,5-trichlorophenol, 2,4,6-trichlorophenol and pentachlorophenol. In particular, 4-chlorophenol is preferable.

Besides the phenol compound of the formula (I), the solvent may contain other component as long as the other component does not precipitate the liquid crystalline polyester during storage of the solution. Preferably, the other component is a chlorohydrocarbon such as o-dichloro-benzene, chloroform, methylene chloride, tetrachloroethane, etc. since it does not interfere with the solubility of the liquid crystalline polyester.

The liquid crystalline polyester used in the present invention may be a thermotropic liquid crystalline polymer and may form a melt exhibiting optical anisotropy at a temperature of 450° C. or less.

Examples of the liquid crystalline polyester include the following polyesters:
(1) a polyester comprising a repeating unit derived from an aromatic hydroxycarboxylic acid, a repeating unit derived from an aromatic dicarboxylic acid and a repeating unit derived from an aromatic diol;
(2) a polyester comprising repeating units derived from two or more different aromatic hydroxycarboxylic acids;
(3) a polyester comprising a repeating unit derived from an aromatic dicarboxylic acid and a repeating unit derived from an aromatic diol;
(4) a polyester prepared by reacting an aromatic hydroxycarboxylic acid with a crystalline polyester such as polyethylene terephthalate.

The aromatic hydroxycarboxylic acid, the aromatic dicarboxylic acid or the aromatic diol may be used in the form of an ester-forming derivative. The ester-forming derivative of the aromatic hydroxycarboxylic acid or the aromatic dicarboxylic acid may be a highly reactive derivative such as a chloride or an anhydride, esters of the aromatic hydroxycarboxylic acid or the aromatic dicarboxylic acid with an alcohol or ethylene glycol which can form a polyester by transesterification. The ester-forming derivative of the aromatic diol may be an aromatic diol, the phenolic hydroxyl group of which forms an ester with a carboxylic acid which can form a polyester by transesterification.

The aromatic hydroxycarboxylic acid, the aromatic dicarboxylic acid and/or the aromatic diol may be substituted with at least one substituent as long as the ester-forming property is not deteriorated. Examples of the substituent include a halogen atom (e.g. a chlorine atom, a fluorine atom, etc.), an alkyl group (e.g. a methyl group, an ethyl group, etc.), an aryl group (e.g. a phenyl group, etc.).

Non-limiting examples of repeating units of the liquid crystalline polyester include the following repeating units:

Repeating units derived from aromatic hydroxy-carboxylic acids

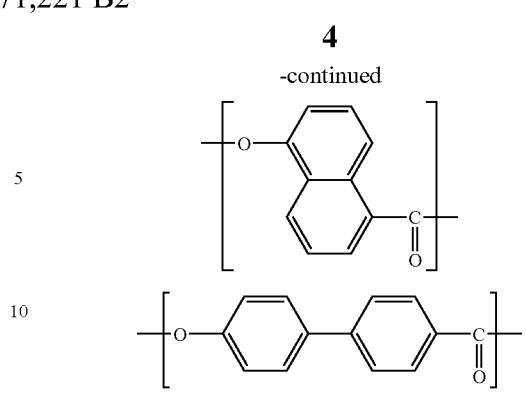

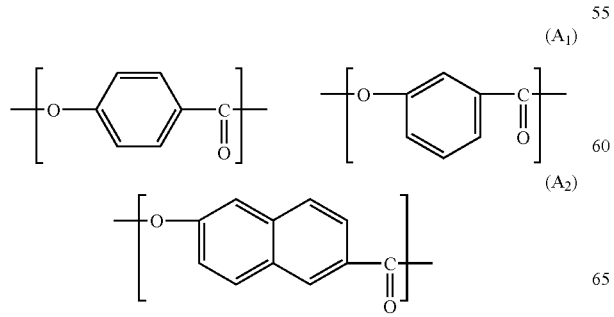

The above repeating units may be substituted with a halogen atom (e.g. a chlorine atom, a fluorine atom, a bromine atom, an iodine atom, etc.) or an alkyl group.

Repeating units derived from aromatic dicarboxylic acids

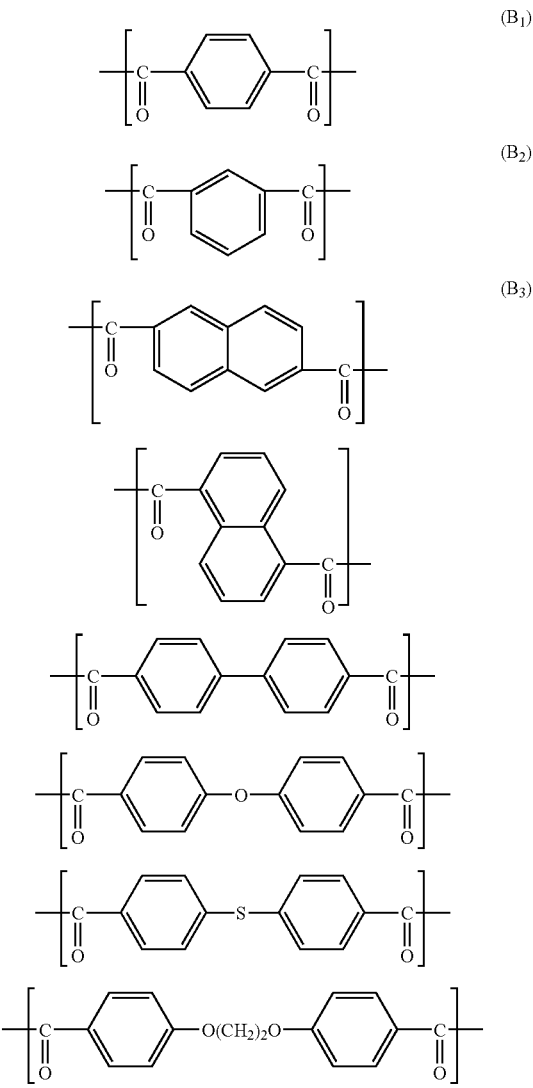

The above repeating units may be substituted with a halogen atom (e.g. a chlorine atom, a fluorine atom, a bromine atom, an iodine atom, etc.), an alkyl group or an aryl group.

Repeating units derived from aromatic diols

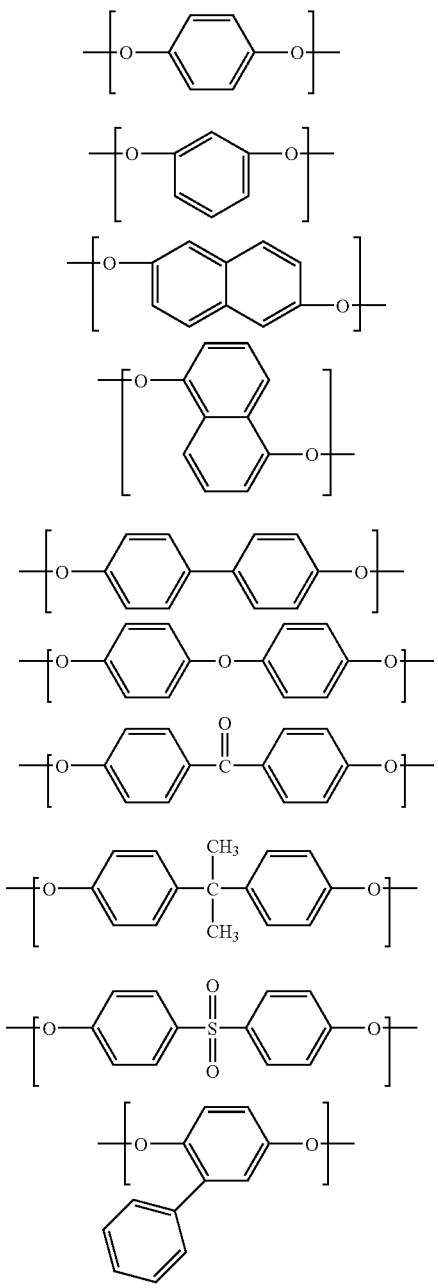

The above repeating units may be substituted with a halogen atom (e.g. a chlorine atom, a fluorine atom, a bromine atom, an iodine atom, etc.), an alkyl group or an aryl group.

Preferably, the above alkyl group has 1 to 10 carbon atoms, and the above aryl group has 6 to 20 carbon atoms. Specific examples of the alkyl group include a methyl group, an ethyl group, a butyl group, etc., and specific examples of the aryl group include a phenyl group, etc.

Preferably, the liquid crystalline polymer comprises at least 30% by mole of the repeating units represented by the formula (Al) from the viewpoint of the balance of heat resistance and mechanical properties.

Preferably, combinations of the repeating units are the following combinations (a) to (f):

(a):
(a1) Combination of the repeating units ($A_1$), ($B_2$) and ($C_3$);
(a2) Combination of the repeating units ($A_2$), ($B_2$) and ($C_3$);
(a3) Combination of the repeating units ($A_1$), ($B_1$), ($B_2$) and ($C_3$);
(a4) Combination of the repeating units ($A_2$), ($B_1$), ($B_2$) and ($C_3$);
(b): Combinations (a1) to (a4) in which at least a part of the repeating units ($C_3$) are replaced by the repeating units ($C_1$);
(c): Combinations (a1) to (a4) in which at least a part of the repeating units ($C_3$) are replaced by the repeating units ($C_2$);
(d): Combinations (a1) to (a4) in which at least a part of the repeating units ($C_3$) are replaced by the repeating units ($C_4$);
(e): Combinations (a1) to (a4) in which at least a part of the repeating units ($C_3$) are replaced by the mixture of the repeating units ($C_4$) and ($C_5$);
(f): Combinations (a1) to (a4) in which a part of the repeating units ($A_1$) are replaced by the repeating units ($A_2$).

From the viewpoint of heat resistance, the liquid crystalline polyester preferably comprises 30 to 80% by mole of repeating units derived from at least one compound selected from the group consisting of p-hydroxybenzoic acid and 2-hydroxy-6-naphthoic acid, 10 to 35% by mole of repeating units derived from at least one compound selected from the group consisting of hydroquinone and 4,4'-dihydroxybiphenyl, and 10 to 35% by mole of repeating units derived from at least one compound selected from the group consisting of terephthalic acid and isophthalic acid.

The weight average molecular weight of the liquid crystalline polyester is not critical, and is preferably from 10,000 to 100,000.

The liquid crystalline polyester used in the present invention may be prepared by any method. For example, at least one compound selected from the group consisting of the aromatic hydroxycarboxylic acids and the aromatic diols is acylated with an excessive amount of an aliphatic carboxylic anhydride to obtain an acylated compound, and then the acylated compound is melt-polymerized with at least one carboxylic acid selected from the group consisting of the aromatic hydroxycarboxylic acids and the aromatic dicarboxylic acids by transesterification (polycondensation). As the acylated compound, an already acylated aliphatic carboxylate ester may be used.

In the acylation process, the amount of the carboxylic anhydride is preferably from 1.0 to 1.2 equivalents, more preferably from 1.05 to 1.1 equivalents, per one equivalent of the phenolic hydroxyl group. When the amount of the carboxylic anhydride is less than the above lower limit, the acylated compound and the aromatic hydroxycarboxylic acid, the aromatic dicarboxylic acid, etc. tend to sublimate during the transesterification (polycondensation) so that a reaction system may be clogged. When the amount of the carboxylic anhydride exceeds the above upper limit, the liquid crystalline polyester obtained tends to be noticeably colored.

The acylation is preferably carried out at a temperature of 130 to 180° C. for 5 minutes to 10 hours, more preferably at a temperature of 140 to 160° C. for 10 minutes to 3 hours.

The kind of the carboxylic anhydride used for acylation is not critical. Examples of the carboxylic anhydride include acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride, etc. These anhydrides may be used independently or in admixture of two or more of them. Among them, acetic anhydride, propionic anhydride, butyric anhydride and isobutyric anhydride are preferable from the viewpoint of their costs and handling properties. More preferably, acetic anhydride is used.

In the transesterification, the acylated compound is preferably used in such an amount that the equivalent of the acyl group is 0.8 to 1.2 times the equivalent of the carboxyl group.

The transesterification is preferably carried out in a temperature range between 130 and 400° C. while raising a temperature at a rate of 0.1 to 50° C./min., more preferably in a temperature range between 150 and 350° C. while raising a temperature at a rate of 0.3 to 5° C./min.

The unreacted carboxylic anhydride and by-produced carboxylic acids are preferably removed from the reaction system by, for example, evaporation to shift the equilibrium in a reaction to the product side during the transesterification of the carboxylate ester prepared by acylation with the carboxylic acid.

The acylation and/or the transesterification may be carried out in the presence of a catalyst. The catalyst may be a conventional catalyst used as a polymerization catalyst for polyester. Specific examples of the catalyst include metal salt catalysts (e.g. magnesium acetate, stannous acetate, tetrabutyl titanate, lead acetate, sodium acetate, potassium acetate, antimony trioxide, etc.), organic compound catalysts (e.g. N,N-dimethylaminopyridine, N-methylimidazole, etc.), and so on. The catalyst may be added to a reactor when the monomers are charged in the reactor. The catalyst used in the acylation may not necessarily be removed, and the reaction mixture obtained by the acylation may be subjected to the transesterification.

The polycondensation through transesterification may be carried out by melt-polymerization, which may be followed by solid phase polymerization. When the solid phase polymerization is conducted, the polymer from the melt-polymerization is preferably milled to obtain the powder-form or flake-form polymer and then it is subjected to the conventional solid phase polymerization. Concretely, the polymer in the solid state from the melt-polymerization is heated in an atmosphere of an inert gas such as nitrogen at a temperature of 20 to 350° C. for 1 to 30 hours. The solid phase polymerization may be carried out with or without agitating the polymer. When a reactor is equipped with a suitable agitation mechanism, the melt-polymerization and the solid phase polymerization can be carried out in the same reactor. After the solid phase polymerization, the liquid crystalline polyester obtained may be pelletized in a conventional manner and then molded or shaped.

The liquid crystalline polyester may be produced batchwise or continuously.

The inorganic silicate (b) used in the present invention may be any conventional silicate. Specific examples of the silicate include 1/1 type layered clay minerals comprising alumina/silicate (1:1) plates (e.g. kaolinite, deckite, nacrite, ruizite, antigorite, crystallite, etc.), mica type clay minerals (e.g. pyrophyllite, talc, muscovite, paragonite, phlogopite, biotite, etc.), 2/1 type layered clay minerals comprising silicate/alumina/silicate plates (e.g. vermiculite, and smectites such as montmorillonite, beidellite, nontronite, saponite, hectite, etc.), and their mixed layered minerals.

Further examples of the inorganic silicate (b) include fibrous clay minerals such as sepiolite, palygorskites, etc., and layered, cubic or cage-form silsesquioxane.

Among the above inorganic compounds, 2/1 type layered clay minerals, in particular, smectites are preferably used. Furthermore, montmorillonite, beidellite, nontronite, saponite or hectite is preferably used. In particular, montmorillonite is preferable.

The inorganic silicate (b) used in the present invention contains a small amount of alkali metals and/or alkaline earth metals. The inorganic silicate (b) used in the present invention contains alkali metals and alkaline earth metals in a total amount of 1,000 ppm or less, preferably 500 ppm or less, more preferably 150 ppm or less, based on the weight of the silicate. Herein, the content of alkali metals and alkaline earth metals is measured by ICP spectroscopy.

When an inorganic silicate contains a relatively large amount of alkali metals and/or alkaline earth metals, the alkali metals and/or alkaline earth metals are removed, for example, by treating the silicate with an acid. Herein, the treatment with an acid comprises the steps of dispersing a silicate in an acid in the liquid state, stirring the dispersion for a certain period of time, preferably 1 minute to 24 hours, and recovering the silicate by filtration. The acid used in this treatment may be an inorganic acid such as sulfuric acid, nitric acid, hydrochloric acid, phosphoric acid, etc. Among them, hydrochloric acid and sulfuric acid are preferable.

The inorganic silicate (b) may be dispersed in the organic resin (a) by any conventional method. Preferably, the inorganic silicate (b) is dispersed in the organic resin(a) by one of the following methods:

(1) the organic resin (a) is dissolved in a solvent in which the inorganic silicate (b) is dispersed;
(2) the inorganic silicate (b) is dispersed in an organic polymer varnish in which the organic resin (a) is dissolved;
(3) the organic resin (a) and the inorganic silicate (b) are melt kneaded with a single- or multi-screw extruder, rolls, a mixer (e.g. a Banbary mixer, etc.) and so on;
(4) the inorganic silicate (b) is charged in a polymerization vessel in which the organic resin is present in the state of a prepolymer prior to the completion of the polymerization, and then the prepolymer is further polymerized.

In the methods (1), (2) and (4), the inorganic silicate (b) may optionally be predispersed in a mixed solvent of an alcohol (e.g. methanol, ethanol, etc.) and an organic acid (e.g. lauric acid, oleic acid, citric acid, etc.) and then the dispersion is mixed with the solution of the organic resin (a). In this case, the concentration of the organic acid in the mixed solvent is preferably about 1 to 10 N (normality).

The amount of the inorganic silicate (b) may be from 0.001 to 50 parts by weight, preferably 0.005 to 10 parts by weight, per 100 parts by weight of the organic resin. When the amount of the inorganic silicate (b) is too large, the mechanical properties of the organic resin (a) may deteriorate. When the amount of the inorganic silicate (b) is too small, the physical properties of the resin composition may not be sufficiently improved.

The resin composition of the present invention may be shaped or molded by a conventional method such as injection molding, blow molding, extrusion, sheet forming, thermoforming, rotational molding, lamination, press molding, etc. to obtain a shaped article.

The resin composition of the present invention may contain fiber reinforcing materials such as glass fiber, and can be used in the production of electric or electronic devices or parts such as connectors, relays, bobbins, etc.

Furthermore, the resin composition of the present invention may be shaped by a film forming method such as extrusion, tubular process (blown film extrusion), casting, etc. A film to be used in the production of an electronic device is preferably produced by casting.

In the case of casting, the resin composition is preferably dissolved in a solvent comprising a halogen-substituted phenol compound of the formula (I) above. In the casting, after the application of the solution on a substrate such as a glass plate, the solvent may be removed by a conventional method such as evaporation of the solvent by heating, application of reduced pressure, air blowing (ventilation), etc. In particular, the solvent is preferably removed by evaporation by heating, more preferably by evaporation by heating with air blowing.

The heating temperature during the removal of the solvent depends on the kinds of the organic resin (a) and the inorganic silicate (b). When a liquid crystalline polyester such as those disclosed in JP-A-2002-114894(corresponding to U.S. Pat. No. 6,838,546) is used as the organic resin (a), the cast solution is preferably predried at a temperature of 100 to 200° C. for 10 minutes to 2 hours, and then heated at a temperature of 200 to 350° C. for 10 minutes to 4 hours.

The film produced by the method described above may have a thickness of about 20 to 200 μm. When a particularly high electric insulation property is required, the thickness of the film is preferably 200 μm or more. The surface of the film may be treated by abrading, physically or chemically with a chemical such as an acid or an oxidizing agent, or by irradiation with UV ray or plasma.

The film comprising the resin composition of the present invention can be used as a flexible printed circuit board, a film for a tab tape, etc. by making use of good high frequency properties, low hygroscopic properties and a low coefficient of thermal expansion of the film. In addition, the film comprising the resin composition of the present invention can be used as a film of a capacitor, a film of a speaker diaphragm, a liquid crystal-orientation film by making use of the thin-wall moldability thereof.

The present invention will be illustrated by the following Examples, which do not limit the scope of the present invention.

SYNTHESIS EXAMPLE 1

In a reactor equipped with a stirrer, a torque meter, a nitrogen gas inlet, a thermometer and a reflux condenser, p-hydroxybenzoic acid (141 g, 1.02 moles), 4,4'-dihydroxybephenyl (63.3 g, 0.34 mole), isophthalic acid (56.5 g, 0.34 mole) and acetic anhydride (191 g, 1.87 moles) were charged. After thoroughly purging the interior of the reactor with nitrogen gas, the reactor was heated to 150° C. over 15 minutes while flowing nitrogen gas in the reactor, and then the mixture was refluxed at 150° C. for 3 hours. Thereafter, the reaction mixture was heated to 320° C. over 170 minutes while evaporating off by-produced acetic acid and unreacted acetic anhydride. When the increase of a torque was recorded, the reaction was regarded as being completed, and the content was removed from the reactor. The solid obtained was cooled to room temperature and coarsely milled, and the milled solid was maintained at 270° C. for 10 hours in a nitrogen atmosphere to proceed solid polymerization to obtain a liquid crystalline polyester powder.

SYNTHESIS EXAMPLE 2

The liquid crystalline polyester powder prepared in Synthesis Example 1 (1 g) was dissolved in 4-chlorophenol (99 g) and stirred at 120° C. for 8 hours to obtain a solution of the liquid crystalline polyester.

SYNTHESIS EXAMPLE 3

An inorganic silicate (montmorillonite; Cloisite-Na$^+$, Southern Clay Products, USA) (10 g) was dispersed in an aqueous solution of hydrochloric acid (pH: 1.2) (100 g) and stirred at 25° C. for 2 hours. The resulting dispersion was filtrated to recover the inorganic silicate. The recovered silicate was redispersed in the aqueous solution of hydrochloric acid (100 g) and stirred at 25° C. for 2 hours. The silicate treated with the acid was recovered from the dispersion by filtration, washed with water (each 100 g) three times, followed by drying and sieving, to obtain silicate powder having a particle size of 30 μm or larger.

The inorganic silicate obtained in the previous step was dispersed in methanol (200 g) containing 2N of lauric acid, and reacted while refluxing at 80° C. for 6 hours to obtain the dispersion of the inorganic silicate in methanol. Then, the dispersion was filtrated through a filter and dried to recover the inorganic silicate. The total content of sodium, potassium, calcium and magnesium in the inorganic silicate was 600 ppm when measured by the ICP spectroscopy

EXAMPLE 1

The solution of the liquid crystalline polyester prepared in Synthesis Example 2 (100 g) and the inorganic silicate obtained in Synthesis Example 3 (1 g) were mixed and refluxed at 130° C. for 4 hours to obtain the solution of the composition containing the liquid crystalline polyester and the inorganic silicate.

EXAMPLE 2

The solution of the composition prepared in Example 1 was casted on a glass plate and heated at 120° C. in a hot air drier to remove the solvent and then heat treated at 250° C. to obtain the film of the liquid crystalline polyester. A coefficient of thermal expansion of the film obtained was measured with TMA (thermomechanical analyzer manufactured by TA Instrument). The coefficient of thermal expansion was $30 \times 10^{-6}$/° C.

COMPARATIVE EXAMPLE 1

The liquid crystalline polyester solution prepared in Synthesis Example 2 (100 g) and a commercially available inorganic silicate (montmorillonite used as a raw material in Synthesis Example 3, which contains 35,000 ppm of sodium, potassium, calcium and magnesium in total measured by the ICP spectroscopy) (1 g) were mixed and refluxed at 130° C. for 4 hours to obtain the solution of the composition containing the liquid crystalline polyester and the inorganic silicate.

COMPARATIVE EXAMPLE 2

The solution of the composition prepared in Comparative Example 1 was casted on a glass plate, heated at 120° C. for 1 hour to semi-dry the casted solution and then heat treated at 250° C. to obtain the film of the liquid crystalline polyester. A coefficient of thermal expansion of the film obtained was measured with TMA. The coefficient of thermal expansion was $40 \times 10^{-6}/°C$.

What is claimed is:

1. An organic resin composition comprising (a) an organic resin and (b) an inorganic silicate, wherein said organic resin (a) comprises a liquid crystalline polyester which is soluble in a solvent containing at least 30% by weight of a halogen-substituted phenol compound represented by the formula (I):

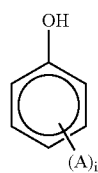

wherein A is a halogen atom or a halogenated alkyl group, and i is the number of A and is an integer of 1 to 5, provided that when i is an integer of 2 to 5, the substituents A may be the same or different;

wherein the liquid crystalline polyester comprises:

30 to 80% by mole of repeating units derived from at least one compound selected from the group consisting of p-hydroxybenzoic acid and 2-hydroxy-6-naphthoic acid, 10 to 35% by mole of repeating units derived from at least one compound selected from the group consisting of hydroquinone and 4,4'-dihydroxybiphenyl, and 10 to 35% by mole of repeating units derived from at least one compound selected from the group consisting of terephthalic acid and isophthalic acid;

wherein the inorganic silicate contains a small amount of alkali metals and/or alkaline earth metals, and wherein the inorganic silicate contains alkali metals and alkaline earth metals in a total amount of 1,000 ppm or less.

2. The organic resin composition according to claim 1, wherein said organic resin (a) comprises a liquid crystalline thermoplastic polymer, a melt of which exhibits optical anisotropy.

3. A solution of a resin composition comprising the organic resin composition according to claim 1 and a solvent.

4. A shaped article comprising the organic resin composition according to claim 1.

5. The shaped article according to claim 4, which is a film.

6. A film obtainable by casting the solution of a resin composition according to claim 3 on a substrate and evaporating the solvent.

7. The organic resin composition according to claim 1, wherein said inorganic silicate (b) is obtained by treating a silicate with an acid.

8. The organic resin composition according to claim 1, wherein A of the formula (I) is a chlorine atom.

9. The solution according to claim 3, wherein the solvent is a halogen-substituted phenol compound.

10. The organic resin composition according to claim 1, wherein an amount of the inorganic silicate (b) is from 0.005 to 10 parts by weight per 100 parts by weight of the organic resin (a).

11. The organic resin composition according to claim 8, wherein an amount of the inorganic silicate (b) is from 0.005 to 10 parts by weight per 100 parts by weight of the organic resin (a).

12. The solution according to claim 3, wherein an amount of the inorganic silicate (b) is from 0.005 to 10 parts by weight per 100 parts by weight of the organic resin (a).

13. The solution according to claim 9, wherein an amount of the inorganic silicate (b) is from 0.005 to 10 parts by weight per 100 parts by weight of the organic resin (a).

* * * * *